(12) United States Patent
Anderson et al.

(10) Patent No.: US 6,958,746 B1
(45) Date of Patent: Oct. 25, 2005

(54) SYSTEMS AND METHODS FOR IMPROVED TELEPRESENCE

(75) Inventors: Matthew O. Anderson, Idaho Falls, ID (US); W. David Willis, Idaho Falls, ID (US); Robert A. Kinoshita, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/542,973

(22) Filed: Apr. 4, 2000

Related U.S. Application Data
(60) Provisional application No. 60/127,826, filed on Apr. 5, 1999.

(51) Int. Cl.[7] .............................. G09G 5/08; G09G 5/00; G06F 17/00; H04N 13/02
(52) U.S. Cl. ....................... 345/161; 345/184; 715/702; 348/48
(58) Field of Search ................................ 345/156, 158, 345/161–163, 168, 172, 184, 700–702, 719, 740, 864, 865; 715/700–702, 719, 740, 864, 865; 725/37; 710/8, 62–65, 73; 348/42, 47, 48, 50, 77, 78, 82, 83, 113, 114, 143, 159

(56) References Cited

U.S. PATENT DOCUMENTS

| | | | | |
|---|---|---|---|---|
| 3,679,286 A | | 7/1972 | Klein ......................... 350/184 |
| 4,418,993 A | | 12/1983 | Lipton ........................ 352/57 |
| 4,751,570 A | * | 6/1988 | Robinson ................. 348/211.6 |
| 4,999,713 A | | 3/1991 | Ueno et al. .................. 358/225 |
| 5,035,493 A | | 7/1991 | Tanaka ....................... 350/429 |
| 5,142,357 A | | 8/1992 | Lipton et al. ................. 358/88 |
| 5,182,641 A | * | 1/1993 | Diner et al. ................. 348/113 |
| 5,436,542 A | * | 7/1995 | Petelin et al. ............... 318/567 |
| 5,612,817 A | | 3/1997 | Strahle ....................... 359/377 |
| 5,631,973 A | * | 5/1997 | Green ........................ 382/128 |
| 5,652,849 A | * | 7/1997 | Conway et al. ............. 345/719 |
| 5,684,531 A | * | 11/1997 | Li et al. ..................... 348/119 |
| 5,687,401 A | | 11/1997 | Kawamura et al. ........... 396/79 |
| 5,706,195 A | * | 1/1998 | Corby et al. ................ 348/114 |
| 5,708,867 A | | 1/1998 | Nagata et al. ................ 396/62 |
| 5,828,487 A | | 10/1998 | Greening et al. ........... 359/466 |
| 6,002,995 A | * | 12/1999 | Suzuki et al. ............... 348/143 |
| 6,148,100 A | * | 11/2000 | Anderson et al. ........... 318/567 |
| 6,259,806 B1 | * | 7/2001 | Green ........................ 382/128 |

* cited by examiner

*Primary Examiner*—Bipin Shalwala
*Assistant Examiner*—Jeff Piziali
(74) *Attorney, Agent, or Firm*—Trask Britt, P.C.

(57) ABSTRACT

The present invention provides a modular, flexible system for deploying multiple video perception technologies. The telepresence system of the present invention is capable of allowing an operator to control multiple mono and stereo video inputs in a hands-free manner. The raw data generated by the input devices is processed into a common zone structure that corresponds to the commands of the user, and the commands represented by the zone structure are transmitted to the appropriate device. This modularized approach permits input devices to be easily interfaced with various telepresence devices. Additionally, new input devices and telepresence devices are easily added to the system and are frequently interchangeable. The present invention also provides a modular configuration component that allows an operator to define a plurality of views each of which defines the telepresence devices to be controlled by a particular input device. The present invention provides a modular flexible system for providing telepresence for a wide range of applications. The modularization of the software components combined with the generalized zone concept allows the systems and methods of the present invention to be easily expanded to encompass new devices and new uses.

30 Claims, 3 Drawing Sheets

SYSTEMS AND METHODS FOR IMPROVED TELEPRESENCE

RELATED APPLICATION

This application claims priority from U.S. provisional application Ser. No. 60/127,826 filed Apr. 5, 1999, which is hereby incorporated by reference.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

The present invention relates generally to remotely controlled robotic systems incorporating telepresence. More particularly, the present invention relates to telepresence systems capable of providing continuous three dimension zooming capability.

2. Present State of the Art

Robotic systems are progressively being implemented as solutions to problems existing in a wide variety of situations and environments. Some of those environments, such as nuclear reactors, are hazardous to humans and the use of robotic systems prevents humans from being unnecessarily exposed to those hazardous conditions. Other environments and situations that may benefit from the use of robotic systems or devices include medical procedures, underwater activities, and security or surveillance systems.

The ability to remotely control robots or robotic systems is becoming more difficult and complex as the robotic systems become more sophisticated and intricate. The complexity arises from the number of tasks that a robotic system may perform as well as the controls that are needed cause the robotic system to perform those tasks. Frequently, operators of remote robotic systems have a need to easily and accurately view the operating environment of the robotic system as well as the objects that are being manipulated by the robotic system. In particular, the ability to display depth is greatly beneficial to remote operators, especially when sensitive objects are being manipulated and handled by the robotic system.

A potential solution to this problem is to permit the robotic system to be controlled by more than one remote operator. The number of controls assigned to each operator may be reduced, but other problems can arise which are related to the interaction of the operators. Frequently, the actions of the operators must be coordinated to produce a particular result. However, the operators are often separated from one another and are often controlling other devices that also require their attention and focus. As a result, the operators are unable to effectively communicate with one another and the performance of the robotic system is reduced.

Other attempts to resolve this problem have incorporated video cameras either attached to the robotic system or placed within the operating environment of the robotic system to provide a telepresence. However, if the camera is a singular unit, the remote operator is unable to perceive depth. The lack of depth perception can lead to serious complications, especially in the case of nuclear reactors. For example, a robotic system may be used to seal hazardous materials in an appropriate container. In this case, the operator must be able to simultaneously view the hazardous material by maneuvering a camera, cause the robotic system to grasp the hazardous material, place the hazardous material in the container, and seal the hazardous material in the container.

Performing these functions is difficult and slow for several reasons. First, the operator is using more than one device to control both the robotic system and the camera. Second, the camera may not provide stereo vision and the operator is unable to perceive depth. If the camera is capable of providing stereo vision, the camera is typically not capable of providing continuous stereo zooming functions. Cameras capable of providing continuous stereo zooming functions require additional controls that simply add to the existing controls. Furthermore, this additional complexity taxes the ability of the remote operator to efficiently operate the robotic system.

In addition, many robotic systems provide a wide variety of hardware devices for performing various tasks, and it is often difficult for an operator to switch control to different devices. What is needed are systems and methods that permit an operator to more easily control a robotic system having telepresence including stereo zooming capabilities as well as systems and methods for allowing an operator to easily reconfigure the hardware devices that are being controlled by the remote operator.

SUMMARY OF THE INVENTION

A telepresence system provides a remote operator the ability to view an operating environment. One embodiment of the present invention provides a hands free intuitive interface that allows an operator of a remote robotic or telepresence system to concentrate on the tasks at hand. The present invention minimizes the complexity of remote stereo vision controls and provides an operator with an accurate view of the operating environment, including depth perception. The interface of the telepresence system and the operator is simplified to provide a modular, reconfigurable system.

In order to provide telepresence, it is often necessary to convert user commands into device motion. Many of the devices on a robotic or telepresence system, including robots, cameras, zoom lenses, slider bars, and the like must often be repositioned, focused or otherwise moved. The present invention defines a generalized zone structure that is translated to device movement. The zones correspond generally to the various axes or directions that a device may move. A slider bar, for example may move along a single axes, while a pan and tilt device may move along multiple axes. The zones are defined such that direction and speed may be inferred from the value of the zones.

The commands are usually received from input devices and the present invention translates the raw data provided by the input devices into a zone structure that is understood by the potential telepresence devices. Telepresence devices only respond to the zones that affect them. Thus, a slider bar will only respond to data in a particular zone and will ignore the information that may be contained in other zones. Because the raw data of the input devices is converted to a zone structure, any input device is easily capable of controlling any telepresence device. In fact, it is possible for a single input device to control multiple telepresence devices.

The telepresence system is further modularized by providing the ability to define multiple views or states. Each view defines an input device and the telepresence devices that are to be controlled by that input device. Depending on the needs of the operator, the operator may issue, for example, a verbal command to change views. One advantage of this modularity is that an operator may use a single device to control a wide variety of telepresence devices. The modularity also allows additional input devices and telepresence devices to be easily and quickly adapted to the systems of the present invention.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
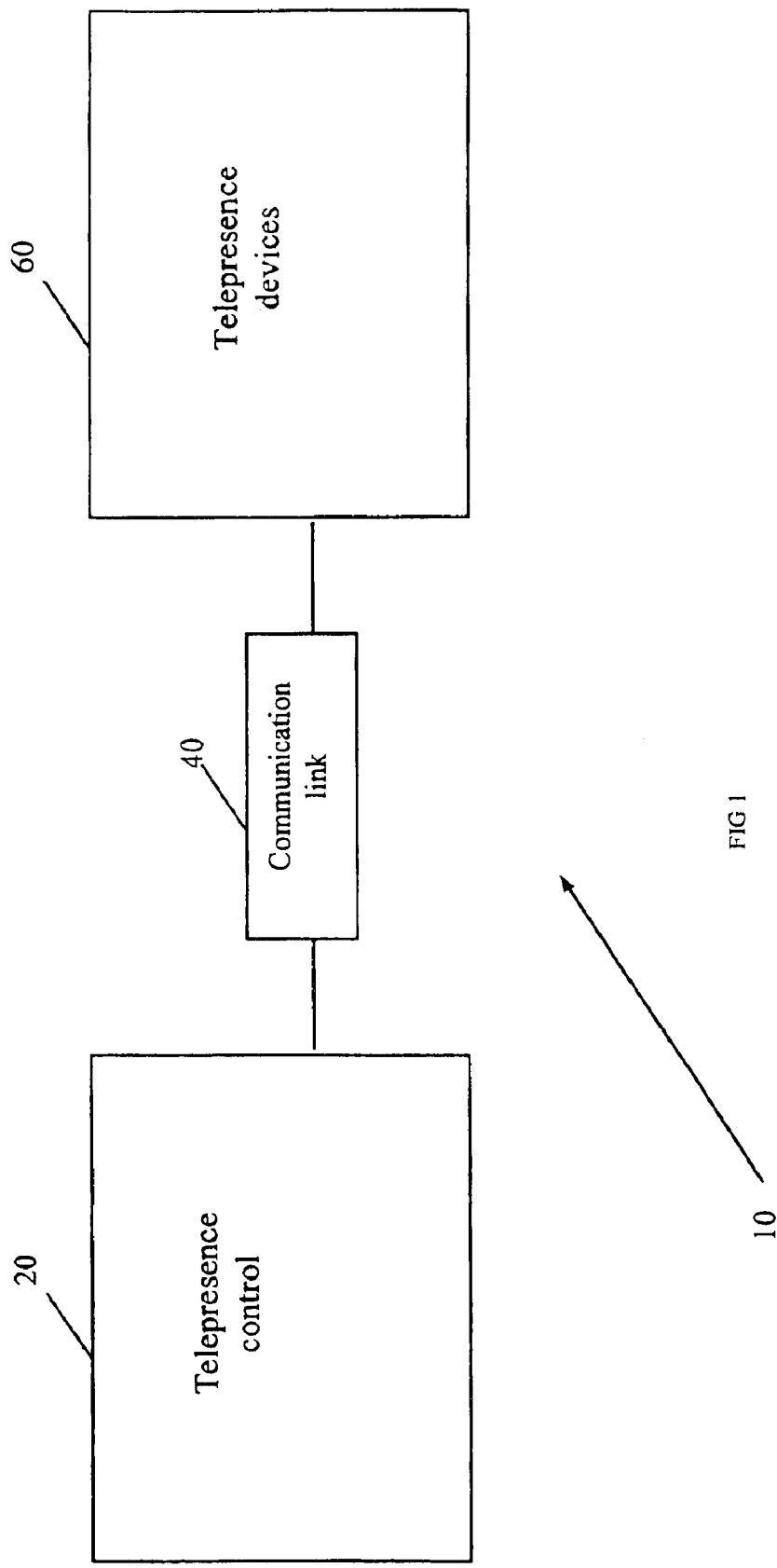
FIG. 1 is a block diagram generally illustrating an exemplary telepresence system.

Telepresence systems generally refer to systems that allow one or more operators to visually perceive a remote operating environment. Frequently, the operators are unable to physically view the operating environment and therefore rely on the telepresence system to provide an accurate representation of the operating environment. An accurate representation of the operating environment allows the remote operators to more effectively carry out their objectives. For example, the ability to defuse an explosive device using a remotely controlled a robot is greatly enhanced if the operator is able to accurately perceive the both explosive device and the environment of the explosive device.

As previously described, providing an operator with an accurate view of the operating environment requires an operator to interact with an excessive number of controls. The present invention alleviates the complexity of operating a sophisticated robotic system including telepresence devices in part by implementing control techniques that enable an operator to control certain aspects of the robotic and telepresence system in a non-conventional yet intuitive manner. For example, it is often desirable for a remote operator to adjust a camera view while manipulating a robotic arm or gripper and one embodiment of the present invention allows the operator to employ a headset to control the movement of the camera while allowing the operator's hands to use a joystick to control the robotic arm or gripper.

In this manner, the complexity of the controls is effectively reduced because the operator is able to intuitively control the camera as the operator's head movements are translated into camera movement and the operator's hands are free to perform other tasks.

The present invention extends both methods and systems for controlling telepresence and robotic systems. The embodiments of the present invention may comprise a special purpose or general purpose computer including various computer hardware. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 is a block diagram illustrating an exemplary telepresence or robotic system illustrated generally as telepresence system 10. Telepresence control 20 communicates with telepresence devices 60 via communication link 40. Communication link 40 is representative of systems and methods that permit communication to occur between telepresence control 20 and telepresence devices 60. Communication link 40 includes, but is not limited to, wireless communication including radio modems and the like as well as physical communication apparatus such as cables and the like. In the case of wireless communication, communication link 40 may comprise a receiver and transmitter at both telepresence control 20 and telepresence devices 60. Communication link 40 may also comprise any means for permitting communication between telepresence control 20 and telepresence devices 60.

The telepresence control 20 is the portion of telepresence system 10 that receives input from an operator through one or more input devices. The input or commands supplied by the operator are transmitted over the communication link 40 to the telepresence devices 60. The telepresence devices 60 may include one or more hardware modules or devices that are capable of being controlled by the operator commands. The operator is also capable of responding to feedback supplied by the telepresence devices 60.

Figure 2:
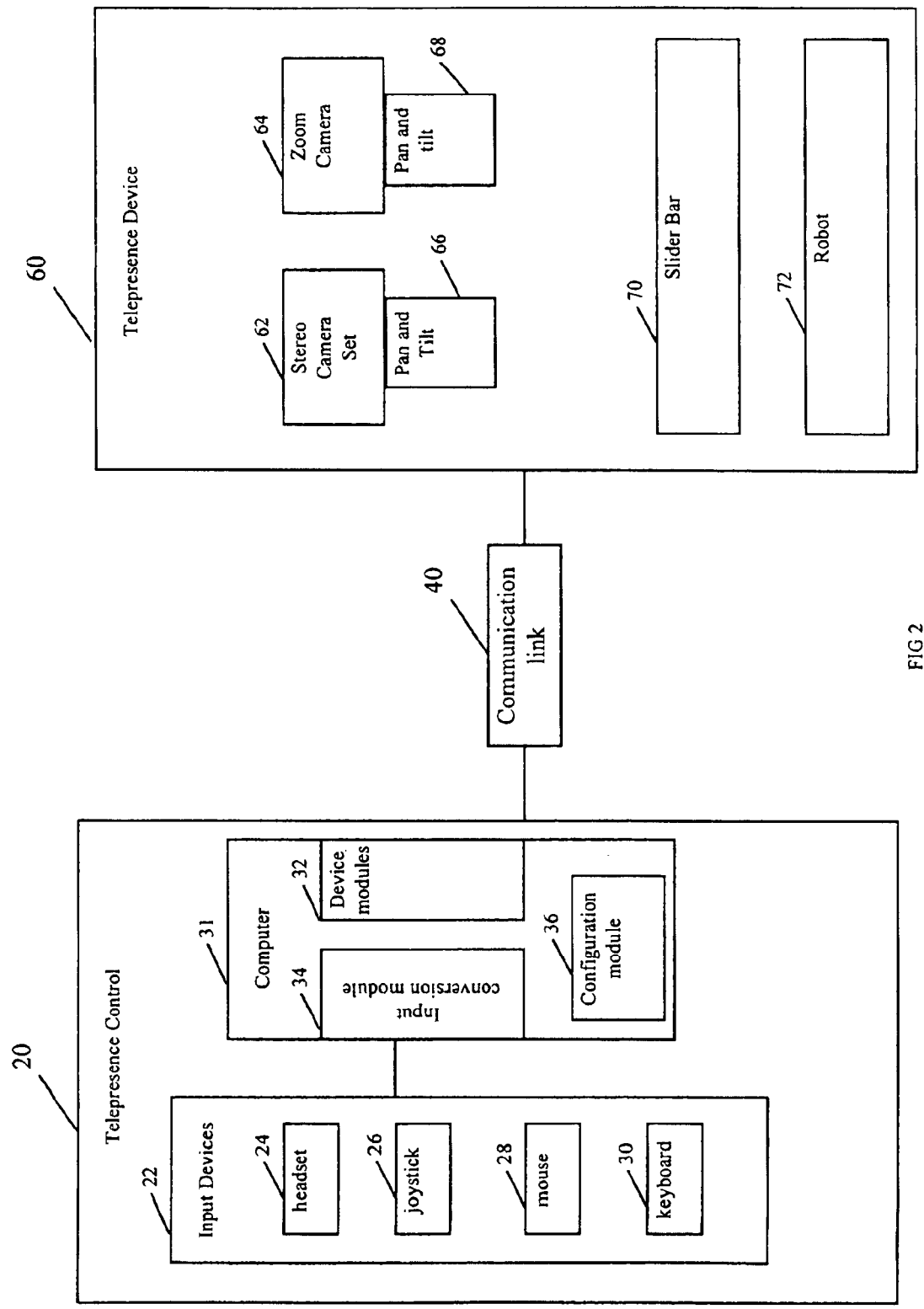
FIG. 2 is a more detailed block diagram of an exemplary telepresence system.

FIG. 2 is a more detailed block diagram illustrating potential configurations of telepresence control 20 and telepresence devices 60. In one embodiment, the telepresence control 20 comprises input devices 22 and a computer 31. The input devices 22 are used to receive input, movement or commands from an operator that are then provided to computer 31. Computer 31 processes these commands and transmits them to the telepresence devices 60 via communication link 40, which may comprise a radio modem. The telepresence devices 60 then execute the operator commands.

Exemplary input devices include, but are not limited to, a headset 24, a joystick 26, a mouse 38 and a keyboard 30. Exemplary telepresence devices include, but are not limited to, stereo camera set 62, zoom camera 64, pan and tilt device (PTD) 66 and 68, slider bar 70, and robot 72. In the illustrated embodiment, the input devices 22 receive input from an operator that is effectively translated into motion by the telepresence devices 60. The input is often in the form of operator movement or motion. For example, the input to the headset 24 is the movement of the operator's head. In the case of a zoom camera, for example, the forward and backward movement of an operator's head may be interpreted as a command to cause a camera to zoom in or out. Alternatively, the forward and backward movement of an operator's head could also be interpreted as a command to physically move the camera either forward or backward. The actual implementation can be configured as needed.

However, it is understood that the present invention encompasses commands that are not related to the movement of the telepresence devices 60. For example, telepresence devices 60 may comprise sensors for monitoring an environment. The commands provided by the operator may be interpreted as command to begin recording data. Other user commands may include causing the stored data to be transmitted to a remote location. The illustrated embodiment of the present invention effectively isolates the input devices 22 from the telepresence devices 60 such that any input device 22 can be used to control any one or more of the telepresence devices 60.

Figure 3:
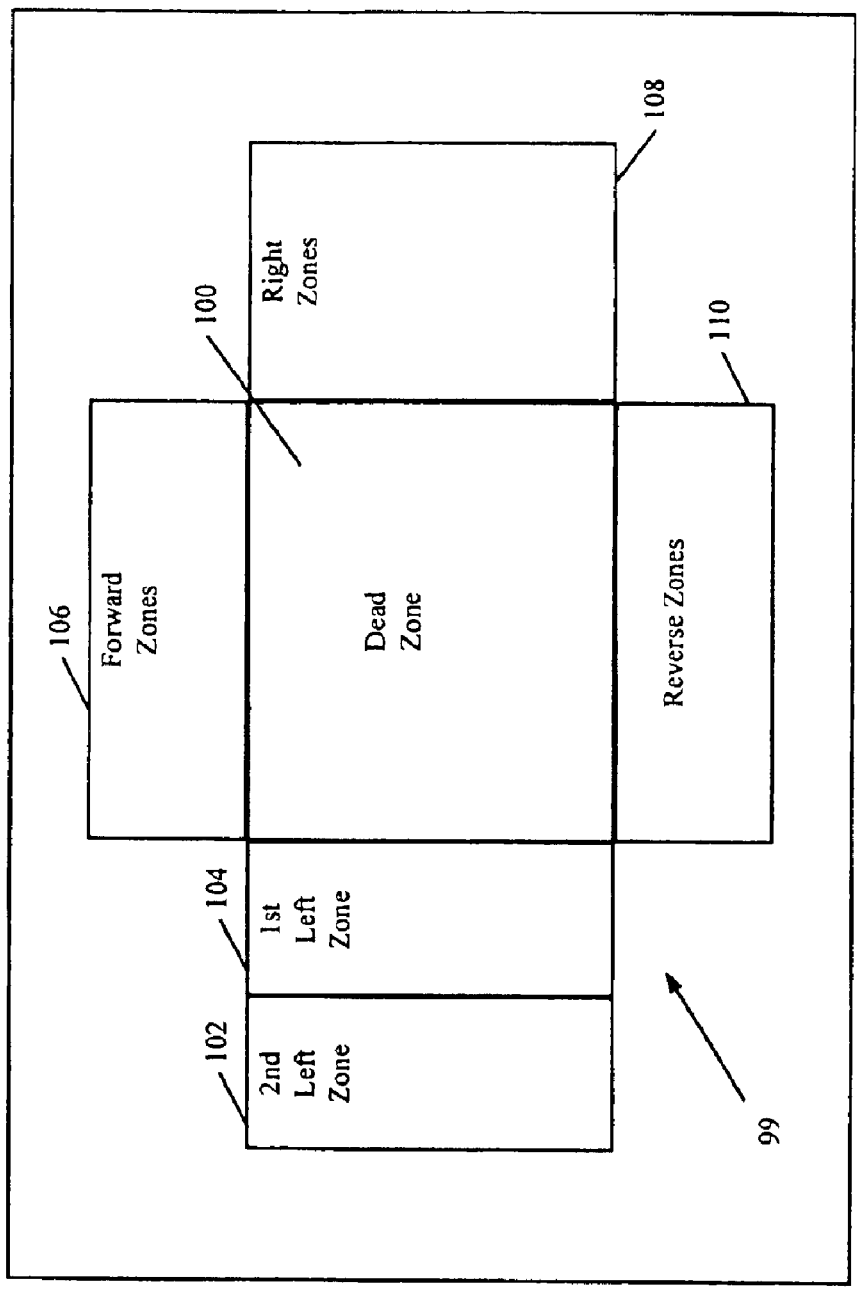
FIG. 3 is a block diagram illustrating the concept of generalized zones for controlling a telepresence system.

This ability to control the motion or other aspect of a telepresence device through any input device 22 is achieved in this embodiment through the use of generalized zones that are described with reference to FIG. 3. FIG. 3 illustrates an exemplary set of zones 99 which are interpreted by a computer as commands to move a telepresence device in a particular direction and at a particular speed. The dead zone 100 is interpreted as no motion and is present essentially to ensure that inadvertent movements are not interpreted as a movement command. Thus, when an operator is using a headset, the operator's head does not need to be held perfectly still and slight head movements will not be interpreted as input commands. First left zone 104 is interpreted as left motion and second left zone 102 is interpreted as a command to move more rapidly to the left. Additional left zones may be implemented, but are not illustrated in FIG. 3. In fact, the actual number of zones can vary and may be tailored to a specific operator. A similar analysis can be applied to forward zones 106, right zones 108 and reverse zones 110.

FIG. 3 is intended to generally illustrate the concept of zones, but is not to be interpreted as limiting the number of zones that may be defined. For example, a headset can be used to interpret approximately six degrees of motion that correspond to movement in the x, y, z, pitch, roll, and yaw directions. Moving the head left and right corresponds to movement in the x direction, moving the head forward and backward corresponds to movement in the y direction, while moving the head vertically corresponds to movement in the z direction. Turning the head left and right corresponds to the yaw direction, nodding the head up and down corresponds to movement in the pitch direction and tilting the head left and right corresponds to movement in the roll direction. However, even though a particular input device such as a headset may have multiple zones, it is possible that the telepresence device implementing the movement commands received from the headset may not be able to move in corresponding directions.

With reference again to FIG. 2, each input device 22 has directions of movement that correspond to the zones as described in FIG. 3. The headset 24 has zones as described above, while the joystick 26, the mouse 28, and the keyboard 30 can also be associated with either the same or different zones. The number of zones is dependent on the input device. Thus the joystick 26 has some of the same zones as the headset 24, but the joystick 26 does not have all of the zones that correspond to the headset 24. Alternatively, the keyboard 30 may have more zones that the headset 24 because each of the keys can be associated with a different zone.

The input commands from the input devices are received by an input conversion module 34 operating at computer 31. The input conversion module 34 receives the raw input from the input devices 22 and converts the raw input into a zone structure that is by the computer 31 for each input device 22. The zone structure may use integers, for example, to define movement in a particular direction. Positive integers correspond to movement in one direction while negative integers correspond to movement in the opposite direction. The magnitude of the integer is often related to the speed of movement. The zone structure thus enables any input device 22 to be compatible with one or more telepresence devices 60.

The zone structure is provided to the device modules 32, which processes the zone structure and issues the appropriate movement or operator command across the communication link 40 to the appropriate telepresence device. The raw data provided by the input devices 22 is converted to the zone structure. In this manner, the use of the zone structure, allows any input device to control any telepresence device and input devices are interchangeable.

Even though a particular input device 22 may have many different directions and zones associated with it, the device modules 32, or more specifically the telepresence devices 60, only respond to the directions that concern the telepresence device being controlled. For purposes of discussion, all potential directions of movement are referred to as axes. For example, slider bar 70 is a device that is capable of moving along a single axis. If the headset 24 is used to control the movement of the slider bar 70, then the device module 32 that controls the slider bar 70 will only respond to those portions of the zone structure that correspond to motion along that axis and the other portions of the zone structure will be ignored for that device. On the other hand, if the headset 24 is used to control the pan and tilt device (PTD) 66, which is capable of movement along multiple axes, then the device module 32 controlling the pan and tilt device 66 will respond to more portions of the zone structure.

More particularly, the input conversion module 34 and the device modules 32 allow any of the input devices 22 to control any of the instruments or hardware component or devices comprising telepresence devices 60. In fact, it is possible for a single input device to control more than one of the telepresence devices 60. For example, if the headset 24 is selected as the input device and the operator desires to control the zoom camera 64, it is also necessary to control the PTD 68, the camera zoom, and the camera focus. The PTD 68 requires two degrees of freedom or axes: tilt and pan. When operators move their heads left and right, the PTD 68 will pan the zoom camera 64 left and right. When operators nod their head up and down, the PTD 68 will tilt the zoom camera 64 up or down. When operators move their head either forward or backward, the magnification provided by the zoom lens of the zoom camera 64 is altered accordingly. The focus of the zoom camera 64 may be achieved when the headset 24 detects the operator's head being turned either left or right. In this manner, a single input device is able to control the movement of more than one telepresence device. The above example illustrates that the present invention has the ability to allow one or more input devices to control one or more telepresence devices. However, it is desirable to allow a particular input device to control a variety of telepresence devices.

While it is possible for more than one input device to be active or used at a time, it is preferable that only one input device be active. It is understood, that the telepresence devices being controlled are typically related to those devices that permit an operator to remotely view an operating environment and that the operator may simultaneously be controlling a robot or other device. Thus, it is preferable that only one input device be active for controlling the telepresence devices that allow the operators to view their actions in the operating environment.

Because a single input device may not be capable of simultaneously controlling all of the telepresence devices 60, configuration module 36 allows an operator to easily change the particular telepresence devices 60 that are being controlled by a particular device. The configuration module 36 defines a plurality of views and each view corresponds to a particular set of devices. Typically, each view defines one input device and the telepresence devices being controlled by that input device. After the views are defined, the operator may switch to a particular view by issuing a verbal command that the computer 31 may recognize, a keyboard command, or other command. When a certain view is active; the selected input device may be used to control the designated telepresence devices. It is understood that more than one view may be active, but only one view is typically utilized because the operator can usually only interact with the visual representation of the operating environment provided by one of the camera sets at a time. If the video provided by another camera set is desired, the operator simply selects another view, a process that is significantly simpler than continually repositioning a particular camera.

The following table describes an exemplary configuration module 36 having a plurality of views. The entries in the table correspond to the input devices 22 and telepresence devices 60 illustrated in FIG. 2.

| View Number | Included Devices |
| --- | --- |
| 1 | Headset 24, PTD 66, stereo camera set 62 |
| 2 | Headset 24, PTD 68, zoom camera 64 |
| 3 | Keyboard 30, PTD 68, zoom camera 64 |
| 4 | Headset 24, robot 72, zoom camera 64 |

Typically, the cameras that may be present as telepresence devices are used to display either a stereo or a static visual representation of the operating environment and by selecting different views, an operator is able to see different aspects of the operating environment without having to move a particular camera. A telepresence system typically has a plurality of camera sets. Some of the camera sets provide stereo vision while others may only provide mono vision. The zoom camera 64 is preferably capable of providing two separate video signals that may be combined to produce stereo vision. Alternatively, the zoom camera 64 may also provide mono vision.

A significant advantage of configuration module 36 is that it may be easily modified to change, add, or remove views. Because the telepresence system as described herein is easily adaptable to any input device, new or different telepresence devices are easily added and controlled. Further, additional input devices may also be added quickly by simply modifying the configuration module 36. Thus, adding a new input device or a telepresence device requires that the configuration module 36 be modified and that the telepresence system be restarted such that the defined views are activated. In addition to defining one or more views, the configuration module 36 may also be utilized to initialize the various input and telepresence devices.

All system commands are also voice activated. Thus, the zones associated with a particular input device may be calibrated or recalibrated, new views may be selected, cameras can be easily moved to a home position, and other actions may be similarly performed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within the scope.

We claim:

1. A telepresence system for allowing an operator to interact with a remote operating environment, the system comprising:

one or more input devices, the one or more input devices configured to produce raw data representative of operator commands;

an input conversion module configured to convert the raw data into a zone structure representative of the operator commands in a telepresence-device independent format, the zone structure being a format independent of any one of the one or more input devices;

one or more device modules corresponding to one or more telepresence devices, the one or more device modules configured to convert the zone structure into telepresence device commands specific to an associated one of the one or more telepresence devices, the zone structure being a format independent of any of the one or more telepresence devices, the telepresence device commands resulting from at least a portion of the operator commands; and a configuration module configured to associate a specific one of the one or more input devices corresponding to the zone structure with a specific one of the one or more telepresence devices which responds to the telepresence device commands resulting from the zone structure.

2. A system as defined in claim 1, wherein the one or more input devices comprise one or more of: a headset, a keyboard, a mouse, and a joystick.

3. A system as defined in claim 1, wherein only one of the one or more input devices is permitted to produce raw data at a time.

4. A system as defined in claim 1, wherein one of the one or more input devices is capable of controlling a plurality of the one or more telepresence devices.

5. The system as defined in claim 1, further comprising a communication link, wherein the telepresence device commands are received by the one or more telepresence devices over a communication link such that the one or more input devices are configured to control the one or more telepresence devices, wherein the telepresence devices provide the operator with one or more visual representations of the operating environment.

6. A system as defined in claim 5, wherein the communication link is a wireless communication link.

7. A system as defined in claim 1, wherein the one or more telepresence devices comprise one or more of a stereo camera set, a zoom camera, a pan and tilt device, a slider bar, and a robot.

8. A system as defined in claim 7, wherein the pan and tilt device is connected to the stereo camera set and is capable of orienting the stereo camera set.

9. A system as defined in claim 7, wherein the pan and tilt device is connected to the zoom camera and is capable of orienting the zoom camera.

10. In a system having input devices and telepresence devices, a method for controlling one or more associated telepresence devices with a selected input device, the method comprising the steps of:

receiving raw data representative of movement commands from the selected input device;

converting the raw data into a zone structure, representative of the movement commands in a telepresence-device independent format, the zone structure being a format independent of any one of the input devices and any one of the one or more associated telepresence devices;

when the selected input device is selectively associated with the one or more associated telepresence devices, processing the zone structure with a device module corresponding to each of the one or more associated telepresence devices to obtain telepresence device commands corresponding to at least a portion of the movement commands for each of the associated telepresence devices; and transmitting the movement commands to the associated telepresence devices.

11. A method as defined in claim 10, wherein the selected input device is one of a headset, a keyboard, a mouse, or a joystick.

12. A method as defined in claim 10, wherein the zone structure is compatible with the telepresence devices.

13. A method as defined in claim 10, wherein the zone structure is capable of representing a plurality of speeds and directions.

14. A method as defined in claim 10, wherein the associated telepresence devices only respond to portions of the zone structure that correspond to the axes of the associated telepresence devices.

15. A method as defined in claim 10, wherein the raw data corresponds to actions of an operator.

16. A method as defined in claim 10, further comprising the step of executing the movement commands by the associated telepresence devices.

17. A computer readable medium having computer-executable instructions for performing the steps recited in claim 10.

18. A telepresence system for allowing an operator to interact with a remote operating environment, the telepresence system comprising:

a plurality of input devices;

a plurality of telepresence devices, wherein one or more of the telepresence devices is configured to be controlled by one of the plurality of input devices and one or more of the telepresence devices is configured to provide a visual representation of the operating environment;

a computer comprising:

an input conversion module configured to receive raw data representative of operator commands from at least one of the plurality of input devices and further configured to convert the raw data to a zone structure representative of the operator commands in a telepresence-device independent format, the zone structure being a format independent of any of the plurality of input devices and any of the plurality of telepresence devices; and a plurality of device modules corresponding to the plurality of telepresence devices configured to receive the zone structure and convert the zone structure to movement commands corresponding to the operator commands for each respective telepresence device; and a communication link for transmitting the movement commands to the telepresence devices.

19. A system as defined in claim 18, wherein the telepresence devices comprises one or more stereo camera sets each connected with a different pan and tilt device and a zoom camera connected with another pan and tilt device.

20. A system as defined in claim 19, wherein the zoom camera is capable of providing stereo vision.

21. A system as defined in claim 18, wherein the raw data generated by the input devices correspond to zones, each zone representative of movement in a particular direction and speed.

22. A system as defined in claim 21, wherein the zone structure integrates any of the input devices with one or more of the telepresence devices.

23. A system as defined in claim 18, wherein the computer further comprises a configuration module.

24. A system as defined in claim 23, wherein the configuration module comprises one or more views, wherein each view defines the one or more telepresence devices controlled by a single input device.

25. A system as defined in claim 24, wherein the operator may select a different view.

26. A system as defined in claim 23, wherein the one or more views stored in the configuration module permits a single input device to control different groups of telepresence devices.

27. A system as defined in claim 18, wherein the plurality of telepresence devices provide the operator with a visual representation of the operating environment.

28. A system as defined in claim 27, wherein the visual representation provides depth perception to the operator.

29. A system as defined in claim 18, wherein the communications link is wireless communication.

30. A system as defined in claim 18, wherein the plurality of input devices allow the operator to control the telepresence devices without the use of the operator's hands.

* * * * *